(12) United States Patent
Gier et al.

(10) Patent No.: US 11,192,341 B2
(45) Date of Patent: Dec. 7, 2021

(54) METHOD FOR PRODUCING A CURVED COMPOSITE GLASS PANE HAVING A THIN GLASS PANE

(71) Applicant: SAINT-GOBAIN GLASS FRANCE, Courbevoie (FR)

(72) Inventors: Stephan Gier, Bous (DE); Stefan Lücke, Alsdorf (DE); Uwe Van Der Meulen, Nideggen (DE); Ingo Von Der Weiden, Aachen (DE); Richard Brocker, Mönchengladbach (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 252 days.

(21) Appl. No.: 16/463,745

(22) PCT Filed: Oct. 27, 2017

(86) PCT No.: PCT/EP2017/077562
§ 371 (c)(1),
(2) Date: May 23, 2019

(87) PCT Pub. No.: WO2018/095693
PCT Pub. Date: May 31, 2018

(65) Prior Publication Data
US 2019/0389180 A1 Dec. 26, 2019

(30) Foreign Application Priority Data

Nov. 24, 2016 (EP) ..................................... 16200376

(51) Int. Cl.
B32B 17/10 (2006.01)
B32B 37/10 (2006.01)
(Continued)

(52) U.S. Cl.
CPC .. *B32B 17/10036* (2013.01); *B32B 17/10119* (2013.01); *B32B 17/10761* (2013.01);
(Continued)

(58) Field of Classification Search
CPC ...... B32B 17/010036; B32B 17/10137; B32B 17/10119; B32B 17/10761;
(Continued)

(56) References Cited

U.S. PATENT DOCUMENTS

| 4,711,653 A | 12/1987 | Frank et al. |
| 7,070,863 B2 | 7/2006 | Meerman |

(Continued)

FOREIGN PATENT DOCUMENTS

| DE | 3 919 290 A1 | 12/1989 |
| EP | 1 358 131 A1 | 11/2003 |

(Continued)

OTHER PUBLICATIONS

Office Action as issued in Korean Patent Application No. 10-2019-7017778, dated Nov. 6, 2020.
(Continued)

*Primary Examiner* — Philip C Tucker
*Assistant Examiner* — Brian R Slawski
(74) *Attorney, Agent, or Firm* — Pillsbury Winthrop Shaw Pittman LLP

(57) ABSTRACT

A method for producing a composite glass pane, includes placing a first glass pane having a thickness less than or equal to 1 mm on a support mould, wherein the first glass pane is curved into a shape determined by the support mould; placing at least one thermoplastic film on the first glass pane; placing a curved second glass pane having a thickness greater than or equal to 1.5 mm on the thermo-
(Continued)

Figure 1:
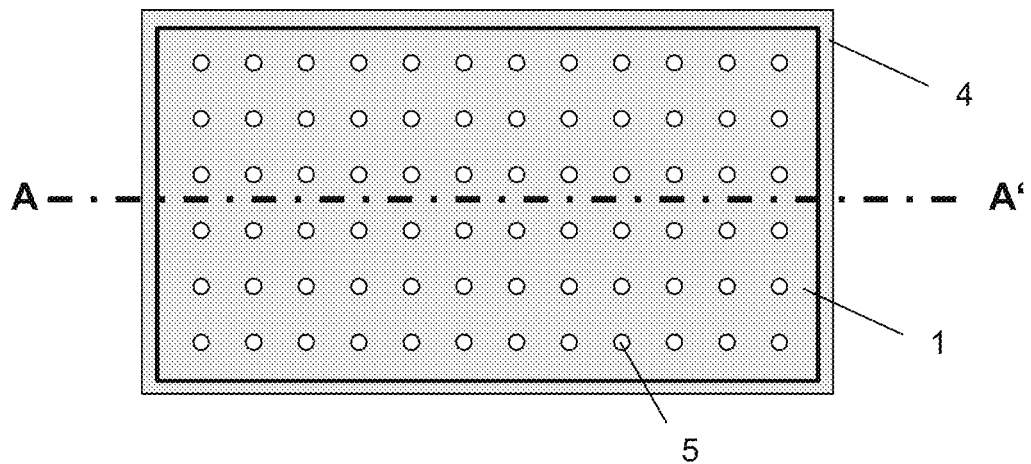

plastic film; and joining the first glass pane to the second glass pane via the thermoplastic film to form a composite glass pane by lamination.

11 Claims, 3 Drawing Sheets

(51) Int. Cl.
| | |
|---|---|
| *B32B 37/18* | (2006.01) |
| *B29C 65/48* | (2006.01) |
| *B29C 51/42* | (2006.01) |
| *B29C 51/14* | (2006.01) |
| *B29C 65/18* | (2006.01) |
| *B29C 51/26* | (2006.01) |
| *B29C 51/10* | (2006.01) |
| *B29C 65/00* | (2006.01) |
| *B29C 67/00* | (2017.01) |

(52) U.S. Cl.
CPC ........ *B32B 37/1018* (2013.01); *B32B 37/182* (2013.01); *B29C 51/10* (2013.01); *B29C 51/14* (2013.01); *B29C 51/266* (2013.01); *B29C 51/425* (2013.01); *B29C 65/18* (2013.01); *B29C 65/486* (2013.01); *B29C 65/4815* (2013.01); *B29C 66/301* (2013.01); *B29C 66/712* (2013.01); *B29C 66/73366* (2013.01); *B29C 66/7465* (2013.01); *B29C 67/0011* (2013.01); *B32B 17/1077* (2013.01); *B32B 17/10788* (2013.01); *B32B 17/10889* (2013.01)

(58) Field of Classification Search
CPC .......... B32B 17/1077; B32B 17/10788; B32B 17/10889; B32B 17/10981; B32B 2605/006; B32B 37/1018; B32B 37/182; B60J 1/00; B29C 51/00; B29C 51/10; B29C 51/14; B29C 51/266; B29C 51/42; B29C 51/421; B29C 51/425; B29C 65/00; B29C 65/02; B29C 65/18; B29C 65/48; B29C 65/4815; B29C 65/486; B29C 66/301; B29C 66/712; B29C 66/73366; B29C 66/7465; B29C 67/0011
USPC ... 156/60, 99, 102, 196, 212, 228, 242, 245, 156/308.2, 309.6, 327, 331.7; 65/102, 65/106, 107, 287
See application file for complete search history.

(56) References Cited

U.S. PATENT DOCUMENTS

| | | | |
|---|---|---|---|
| 2007/0221313 A1* | 9/2007 | Franck | F24S 23/82 156/91 |
| 2014/0141206 A1 | 5/2014 | Gillard et al. | |
| 2015/0202854 A1* | 7/2015 | Tsuchiya | B32B 1/00 428/179 |
| 2016/0297169 A1 | 10/2016 | Notsu et al. | |
| 2017/0008377 A1* | 1/2017 | Fisher | B32B 17/1088 |

FOREIGN PATENT DOCUMENTS

| | | |
|---|---|---|
| EP | 1 836 136 A1 | 9/2007 |
| EP | 2 421 704 A1 | 2/2012 |
| EP | 2 463 247 A1 | 6/2012 |
| EP | 2 463 248 A1 | 6/2012 |
| EP | 3 078 488 A1 | 10/2016 |
| EP | 3 138 689 A1 | 3/2017 |
| JP | H08-034630 A | 2/1996 |
| JP | 2000-219544 A | 8/2000 |
| JP | 2014-523389 A | 9/2014 |
| JP | 2014-527011 A | 10/2014 |
| KR | 10-2016-0095143 A | 8/2016 |
| SU | 617395 A1 | 7/1978 |
| WO | WO 02/064519 | 8/2002 |
| WO | WO 2006/072721 A1 | 7/2006 |
| WO | WO 2010/121986 | 10/2010 |
| WO | WO 2011/096447 A | 8/2011 |
| WO | WO 2012/177426 A1 | 12/2012 |
| WO | WO 2013/132174 A1 | 9/2013 |
| WO | WO 2014/109237 A1 | 7/2014 |
| WO | WO 2014/182185 A1 | 11/2014 |
| WO | WO 2015/058885 A1 | 4/2015 |
| WO | WO 2015/092385 A1 | 6/2015 |
| WO | WO 2015/158464 A1 | 10/2015 |
| WO | WO 2016/091435 A1 | 6/2016 |

OTHER PUBLICATIONS

International Search Report as issued in International Patent Application No. PCT/EP2017/077562, dated Jan. 18, 2018.
Office Action as issued in Japanese Patent Application No. 2019-528115, dated Jan. 4, 2021.

* cited by examiner

A – A'

B – B'

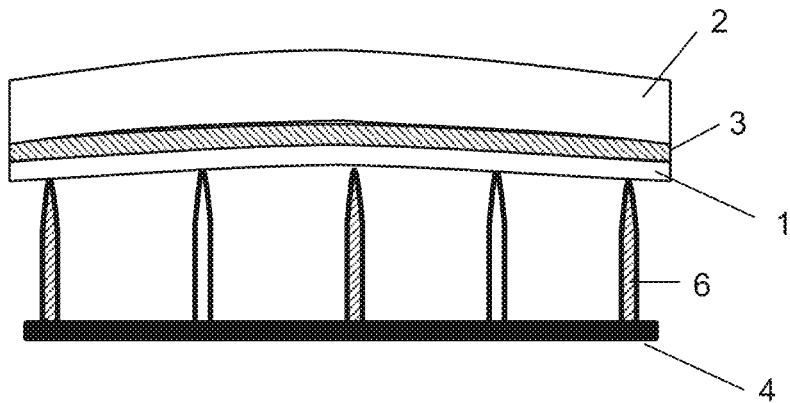

Fig. 5

```
┌─────────────────────────────────────────────────────────┐
│ Placing a first glass pane 1 made of aluminosilicate glass │
│ with a thickness of 0.6 mm on a convex support mould 4, │
│         wherein the first glass pane 1 is curved        │
└─────────────────────────────────────────────────────────┘
                            ↓
┌─────────────────────────────────────────────────────────┐
│     Placing a thermoplastic film 3 made of PVB with a   │
│       thickness of 0.76 mm on the first glass pane 1    │
└─────────────────────────────────────────────────────────┘
                            ↓
┌─────────────────────────────────────────────────────────┐
│        Placing a pre-bent second glass pane 2 made of   │
│          soda lime glass with a thickness of 2.1 mm     │
│                  on the thermoplastic film 3            │
└─────────────────────────────────────────────────────────┘
                            ↓
┌─────────────────────────────────────────────────────────┐
│    Mounting a vacuum ring on the side edge of the       │
│    layer stack comprising the first glass pane 1, the   │
│          film 3, and the second glass pane 2            │
└─────────────────────────────────────────────────────────┘
                            ↓
┌─────────────────────────────────────────────────────────┐
│       Deaerating the layer stack via the vacuum ring    │
└─────────────────────────────────────────────────────────┘
                            ↓
┌─────────────────────────────────────────────────────────┐
│     Laminating the layer stack to form the composite    │
│                 glass pane by heating                   │
└─────────────────────────────────────────────────────────┘
```

Fig. 6

METHOD FOR PRODUCING A CURVED COMPOSITE GLASS PANE HAVING A THIN GLASS PANE

CROSS-REFERENCE TO RELATED APPLICATIONS

This application is the U.S. National Stage of PCT/EP2017/077562, filed Oct. 27, 2017, which in turn claims priority to European patent application number 16200376.8 filed Nov. 24, 2016. The content of these applications are incorporated herein by reference in their entireties.

The invention relates to a method for producing a curved composite glass pane, a composite glass pane produced therewith and use thereof.

Composite glass panes are common as motor vehicle glazings, in particular as windshields or roof panels. They are made of two glass panes, which are joined to one another via a thermoplastic intermediate layer. Typical thicknesses of the glass panes in conventional composite glass panes are approx. 2 mm. Glazings in the automotive sector are frequently curved. The relatively thick individual glass panes of conventional composite glass panes are first heated to softening temperature and bent. After solidification, they have a dimensionally stable curvature and are then laminated to form the composite glass pane. In order to optimally match the shape of the two glass panes to be joined, they can be simultaneously bent congruently in pairs positioned one atop the other. Such bending methods are, for example, known from EP 1 836 136 A1, EP 1 358 131 A1, EP 2 463 247 A1, and EP 2 463 248 A1.

In order to reduce the weight of the glazings, there are efforts to reduce the thickness of the individual glass panes, whereby, nevertheless, the requirements for stability and break resistance of vehicle windowpanes must be met. Thus, composite glass panes that have a thin glass pane having a thickness less than 1.5 mm or even less than 1 mm are increasingly proposed. Merely by way of example, reference is made to EP 2 421 704 A1, U.S. Pat. No. 7,070,863 B2, DE 3 919 290 A1, WO 2015/058885 A1, WO 2015/158464 A1, and WO 2016/091435 A1. To increase the stability, the thin glass panes can be chemically tempered.

The use of thin glass panes necessitates production methods adapted thereto. Conventional bending of the thin glass panes is frequently difficult. On the one hand, the thin glass panes are susceptible to breakage during handling; on the other, they often have chemical compositions with high softening temperatures, making bending energy-intensive. If a thin and a thick glass pane are to be laminated to one another, they also usually have different compositions, with the common, inexpensive soda lime glass used for the thick glass pane and, in contrast, a glass composition for the thin glass pane is selected in terms of suitability for chemical tempering. The associated different softening temperatures of the two panes make bending in pairs difficult or impossible.

Thin glass panes are, however, already so flexible at room temperature that they can be cold bent directly during lamination and prior bending into a dimensionally stable shape can be dispensed with. However, if the glass panes and the intermediate layer are simply stacked one atop another, contact pressure that is not constant over the entire surface results from the non-coordinated shape of the panes and from the restoring force of the cold-bent thin glass pane. This reduces the quality of the laminated glasses which are prone to optical defects and delamination.

The object of the present invention is to provide an improved method for producing curved composite glass panes having a thin glass pane. Hot bending of the thin glass pane should be dispensed with and high optical quality and mechanical laminate stability should nevertheless be ensured.

The object of the present invention is accomplished according to the invention by a method for producing a composite glass pane according to the independent claim 1. Preferred embodiments are apparent from the dependent claims.

The composite glass pane to be produced is provided for separating an interior, in particular a vehicle interior, from an external environment. It is thus a window pane that is intended to be inserted in a window opening, in particular a window opening of a vehicle body. It is curved and comprises a first glass pane and a second glass pane, which are joined to one another via a thermoplastic intermediate layer. The first glass pane is a thin glass pane having a thickness of up to 1 mm. The second glass pane has a thickness greater than or equal to 1.5 mm, as is customary for conventional laminated glasses. The thicker second glass pane is pre-bent conventionally into its final shape. To that end, it is heated to at least its softening temperature and then reshaped, i.e., hot bent. The thin first glass pane is, in contrast, not pre-bent (in the sense of hot bending), but rather, during the arranging of the layer stack to be laminated, significantly below its softening temperature, is brought out of its planar initial state through mechanical pressure into the desired shape, i.e., cold bent. The defined shape and uniform contact pressure within the layer stack are ensured, according to the invention, by the use of a support mould. The support mould predefines the desired curvature and counteracts the restoring forces of the thin, elastic glass pane, as a result of which the layer stack can be handled safely and laminated with high optical and mechanical quality.

The method according to the invention comprises at least the following steps:

placing a first glass pane having a thickness less than or equal to 1 mm on a support mould, wherein the first glass pane is cold bent into a shape determined by the support mould;

placing at least one thermoplastic film on the first glass pane;

placing a curved second glass pane having a thickness greater than or equal to 1.5 mm on the thermoplastic film; and joining the first glass pane to the second glass pane via the thermoplastic film to form a composite glass pane by lamination.

The glass panes and the film are congruently placed areally, wherein it is also possible to use a thermoplastic film that is larger than the glass panes and protrudes beyond them and to trim off the protruding parts of the film after lamination. The steps are preferably carried out in the order indicated. Variations are, however, also conceivable. Thus, it is possible to first place the thermoplastic film on the first glass pane and then place both together on the support mould with the first glass pane pointing downward. It is likewise possible to place the second glass pane on the thermoplastic intermediate layer and then place both with the thermoplastic film pointing downward on the first glass pane situated on the support mould. Of course, the entire layer stack comprising the first glass pane, the thermoplastic film, and the second glass pane must be arranged on the support mould before it is further handled and ultimately laminated.

According to the invention, the support mould predefines the desired final shape of the composite pane. It has a curved contact surface or contact points that define a curved surface, wherein the curvature of the contact surface or the surface defined corresponds to the desired curvature of the composite glass pane. The first glass pane and the thermoplastic film rest on the contact surface or the contact points and are thus brought into the desired shape. Since this bending of the first glass pane occurs significantly below its softening temperature and preferably at ambient temperature without active heating, the bending operation is referred to as cold bending. Due to the flexibility and the elasticity of the thin glass pane, cold bending is possible without glass breakage.

The support mould can, in principle, be concave or convex, but is preferably convex. This means that the contact surface of the support mould or the surface defined by the contact points is convex such that the surface of the first glass pane facing the support mould is concave and the surface of the first glass pane facing away from the support mould is curved convexly. Accordingly, with a convex support mould, a composite pane is produced in which the surface of the thin first glass pane is concave and the surface of the thicker second glass pane facing away from the intermediate layer is convex. Since typical vehicle glazings have a complex outer surface and a concave interior surface, the convex support mould consequently enables composite glass panes, in which the thin first glass pane is the inner pane and the thicker second glass pane is the outer pane, usually preferred for reasons of stone impact and scratch resistance. Alternatively, it is, however, also possible, using a concave support mould, to produce a composite glass pane whose outer pane is the thin first glass pane, if so desired. In the context of the invention, the term "outer pane" refers to that glass pane which is intended to face the external environment in the installed position. The term "inner pane" refers to that glass pane that is intended to face the interior in the installed position. The terms "exterior-side" and "interior-side" are to be interpreted similarly.

The second glass pane already substantially has its final curved shape at the time of placement on the support mould. For that, the second glass pane is previously heated at least to softening temperature in its original planar initial state, bent, and cooled for solidification. For this, all common glass bending methods, for example, gravity, compression, or suction bending, are suitable. The curvature of the second glass pane corresponds substantially to the curvature of the contact surface of the support mould.

The placement of the first glass pane on the support mould can be done solely under the effect of pressure, either only by the force of the weight of the second glass pane or, additionally, by pressure exerted mechanically from above. In a particularly advantageous embodiment, the first glass pane is sucked onto the support mould by application of a negative pressure and bent thereby. For this, the support mould must be equipped with, or suitably connectable to, a means for generating a negative pressure. Here, the term "negative pressure" refers to a pressure that is lower than the ambient pressure. That can be advantageous in terms of handling or of processing speed.

The support mould according to the invention can be implemented in various ways. In a preferred embodiment, the support mould has a support surface for the first glass pane. When the first glass pane is placed on the support mould, it makes substantially full-surface contact with the support surface. Regions of the pane can be excluded from contact with the support surface, for example, an edge region protruding beyond the support surface or regions of the pane that are arranged above interruptions in the support surface. Such interruptions can, for example, result from openings, holes, or feed-throughs in the support surface, which the support mould preferably has in order to exert suction on the first glass pane and to suck it against the curved support surface for cold bending. The holes are connected to a means for generating negative pressure by means of which the suction is generated. Preferably, at least 80% or even at least 90% of the pane surface makes contact with the support surface. The support surface can be padded, for example, by a coating or an overlay made of a woven fabric.

In another preferred embodiment, the support mould has a plurality of support pins, on which the first glass pane rests in a substantially point-wise manner. The support mould then has no contact surface in the actual sense, but, instead, a plurality of contact points that define a curved surface that corresponds to the shape of the cold-bent glass pane. The contact points are formed by the contact of the glass pane with the upward pointing ends of the contact pins. They are, of course, not points in the strict mathematical sense but have a finite extent such that each contact pin has a small contact surface that is preferably at most 10 $cm^2$, particularly preferably at most 4 $cm^2$. The totality of all contact surfaces is, however, substantially smaller than the extent of the glass pane. The proportion of the glass pane surface that makes direct contact with the support pins is, for example, less than 10%. The support pins can have openings via which suction can be transferred to the glass pane in order to suck it against the support pins.

The number and the spacing of the support pins can be suitably selected by the person skilled in the art in accordance with the complexity of the curvature of the pane. Thus, in the case of panes with relatively simple curvature, few support pins are sufficient, whereas more complex curvatures with small local radii of curvature and a plurality of differently curved regions can be realised by a larger number of support pins. Preferably, the support mould should have at least five support pins, with four support pins associated with the corner regions of the glass pane and one support pin associated with the centre of the pane. The number of the support pins depends on the size and geometry of the pane in the individual case and can be selected accordingly by the person skilled in the art. Sufficient support pins should be used such that local counter-bending of the glass does not occur.

In a particularly advantageous embodiment, at least two of the support pins are actively heatable, preferably multiple support pins, particularly preferably at least three support pins, and most particularly preferably at least 5 support pins. For this, the support pins can be equipped, for example, with heating coils. The layer stack placed can be heated by the heatable support pins in the region of the contact points. Thus, at a suitable temperature, point-wise adhesive bonding of the two glass panes can be achieved via the thermoplastic film. By means of adhesive bonding at two points, the layer stack is secured against slippage. A larger number of heatable support pins further increases the stability of the layer stack. Here, it can be advantageous to exert additional mechanical contact pressure from above. This produces a pre-laminate that fixes the form of the layer stack achieved on the support mould. The layer stack can then be removed from the support mould and be laminated to form the composite glass pane independently of the support mould, optionally, after additional processing steps.

One advantage of the support pins compared to a support surface consists in that one and the same support mould can be adapted to different pane shapes and, consequently, can be used more versatilely. To that end, in an advantageous embodiment, the support pins are movable independently of one another along their extension direction. Thus, their height can be changed. It is likewise advantageous to implement at least some of the support pins or all of the support pins movable in the plane perpendicular to their extension direction. Thus, the relative position on the pane can be changed and adapted to the geometry of the composite glass pane to be produced.

Consequently, in a preferred embodiment, the support pins are movable relative to one another and, in fact, in their extension direction and/or perpendicular to their extension direction. The support mould is preferably equipped with means for moving the support pins, for example, with threaded spindles or servomotors for displacing the support pins or mechanical, hydraulic, or pneumatic means for raising and lowering the support pins. The support mould can be adjusted to a pane shape by moving the support pins such that their contact points define a surface that corresponds to the pane shape. The movement of the support pins can be manual or automated. Thus, it is conceivable, in the context of industrial mass production, for the geometric values of the pane to be read into software, which, in turn, actuates the support pins and adapts the support mould to the pane geometry.

There are no restrictions with regard to the material of the support mould, in particular of the contact surface or of the support pins, as long as the support mould is stable enough to support the layer stack. Since no hot bending takes place on the support mould, it need not even be heat resistant. Consequently, the materials can be freely selected in the individual case by the person skilled in the art. Suitable materials are, for example, metals or alloys such as steel or aluminium, but also wood or plastics.

The thin first glass pane preferably has a thickness of 0.2 mm to 1.0 mm, particularly preferably 0.4 mm to 0.7 mm. Such thin glass panes can readily be cold bent. The first glass pane can be hardened to increase its break resistance, making handling simpler during cold bending. Since glass panes with these low thicknesses can be thermally tempered only with difficulty or not at all, the first glass pane is preferably chemically tempered.

The first glass pane is preferably made of a type of glass that can readily be chemically tempered. Consequently, the first glass pane is preferably made of aluminosilicate glass, in particular of alkali-aluminosilicate glass. The chemical tempering is done by exchanging smaller alkali ions for larger alkali anions (for example, sodium ions for potassium ions), as a result of which depth-dependent compressive stresses are produced. Moreover, this type of glass is distinguished by high scratch resistance and hardness.

The second glass pane is preferably made of soda lime glass which is common as window glass and is, consequently, widely used and comparatively economical. In principle, the second glass pane can also be made of other types of glass. The thickness of the second glass pane is preferably from 1.5 mm to 5 mm. A second pane with these thicknesses yields, along with the thin first glass pane, a laminated glass that is suitable in terms of its stability and overall thickness as vehicle glazing.

The thermoplastic film preferably contains polyvinyl butyral (PVB), ethylene vinyl acetate (EVA), or polyurethane (PU), particularly preferably PVB. It preferably has a thickness of 0.2 to 2 mm, in particular 0.5 mm to 1.6 mm.

The joining of the glass panes via the thermoplastic intermediate layer can be done by all common lamination methods. The lamination is typically done under the action of temperature, pressure, and/or vacuum. Preferably, lamination includes deaerating the layer stack, wherein negative pressure is applied to remove air from the intermediate space between the glass panes and the thermoplastic films, and heating the layer stack, wherein the thermoplastic film softens and produces the adhesive bonding to the pane surface.

For deaerating, vacuum bag methods, in which the layer stack is arranged in a bag in which a negative pressure is then generated can, for example, be used. Alternatively, vacuum ring methods, in which the side edge is provided with a circumferential hose in which negative pressure is generated, can be used. Production of the final adhesive bond can be done in an autoclave in which the deaerated layer stack is preferably heated and subjected to positive pressure.

The lamination can be done on the support mould, where the curved shape is stabilised. The pane can, however, also be removed from the support mould for lamination so long as the curved shape is stabilised by other measures, for example, by the above-described local adhesive bonding by means of heated support pins.

The invention also includes a composite glass pane produced or producible using the method according to the invention, comprising a first glass pane having a thickness less than or equal to 1 mm and a second glass pane having a thickness greater than or equal to 1.5 mm, which are joined via at least one thermoplastic film.

The invention also includes a device for producing a composite glass pane according to the invention, comprising a support mould that determines the desired final shape of the composite glass pane, and a means for laminating the composite glass pane. The advantageous embodiments described above in connection with the method according to the invention apply equally to the device.

The invention also includes the use of a composite glass pane produced with the method according to the invention as a window pane of a vehicle, for example, as a windshield, side window, rear window, or roof panel. The thin first glass pane preferably forms the inner pane of the composite glass pane and faces the vehicle interior, whereas the thicker second glass pane faces the external environment.

Figure 2:
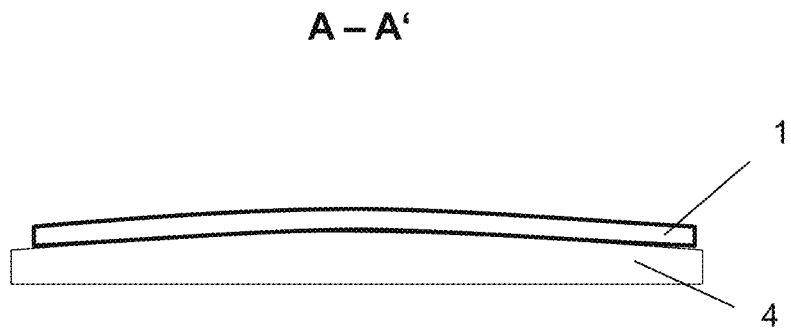
Figure 3:
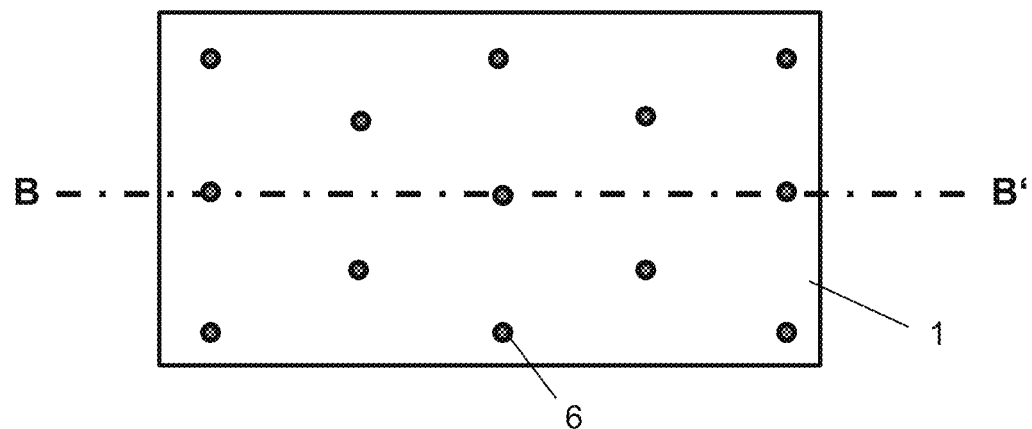
Figure 4:
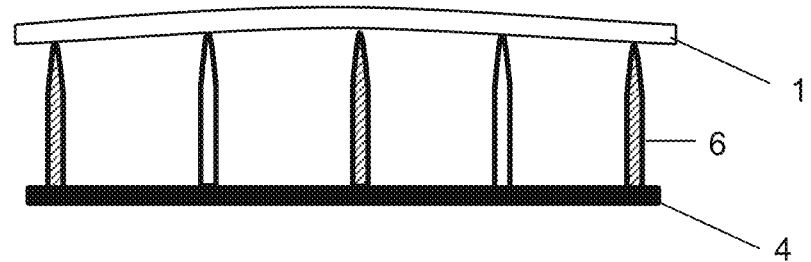

The invention is explained in detail with reference to drawings and exemplary embodiments. The drawings are a schematic representation and not true to scale. The drawings in no way restrict the invention. They depict:

FIG. 1 a plan view of an embodiment of the support mould according to the invention with the first glass pane placed thereon, FIG. 2 a cross-section through the support mould of FIG. 1, FIG. 3 a plan view of another embodiment of the support mould according to the invention with the first glass pane placed thereon, FIG. 4 a cross-section through the support mould of FIG. 3, FIG. 5 a cross-section through the support mould of FIG. 3 with the entire layer stack placed thereon before lamination, FIG. 6 an exemplary embodiment of the method according to the invention using a flowchart.

FIG. 1 and FIG. 2 depict in each case a detail of an embodiment of the support mould 4 according to the invention. The support mould 4 has a substantially full-surface contact surface, which is interrupted only by small openings 5. A first glass pane 1 is arranged on the contact surface of the support mould 4. The first glass pane 1 is, for example, a 0.6-mm-thick, chemically tempered pane made of aluminosilicate glass.

The convex contact surface of the support mould 4 has a curvature that corresponds to the desired curvature of the composite glass pane. The first glass pane 1 is planar in the initial state, adapts due to its low thickness and the associated flexibility to the contact surface, and is bent at ambient temperature without active heating (cold bent).

The openings 5 can be connected to a means for generating a negative pressure, for example, a fan or a vacuum pump. Thus, suction can be generated, by means of which the first glass pane 1 is sucked against the contact surface of the support mould 4.

FIG. 3 and FIG. 4 depict in each case a detail of another embodiment of the support mould 4 according to the invention. The support mould 4 has, in this embodiment, no large-area contact surface, but, instead, a plurality support pins 6. The upper ends of the support pins 6 define a curved surface, whose curvature corresponds to the desired curvature of the composite glass pane. A first glass pane 1 rests substantially point-wise on each support pin 6; a large-area direct contact between the support mould and the glass pane 1 is avoided.

If some or all support pins 6 are heatable, the layer stack can be adhesively bonded locally in the region of the support points. Thus, a local adhesive bond can be produced such that a type of pre-laminate is created and the layer stack is stabilised in its curved form and can be removed from the support mould 4.

The curvature can be modified by a vertical displacement of the support pins 6 relative to one another. Thus, one and the same support mould 4 can be used for producing composite glass panes of different types.

FIG. 5 depicts a cross-section through a layer stack for lamination on a support mould 4 as in FIG. 4. Apart from the first glass pane 1 on the support pins 6, the layer stack comprises a thermoplastic film 3 on the first glass pane 1 and a second glass pane 2 on the thermoplastic film 3. The thermoplastic film 3 is, for example, a 0.76-mm-thick PVB film. The second glass pane 2 is, for example, a 2.1-mm-thick pane of soda lime glass. The second glass pane 2 is, due to its thickness, not sufficiently flexible to be cold bent and is, consequently, already pre-bent into the final shape by means of conventional bending methods, for example, by compression bending.

The support mould 4 ensures uniform contact pressure within the layer stack. The subsequent lamination results in a composite glass pane with high optical quality and without critical tendencies for delamination.

FIG. 6 depicts an exemplary embodiment of the method according to the invention for producing a composite glass pane using a flowchart.

LIST OF REFERENCE CHARACTERS (1) first glass pane
(2) second glass pane
(3) thermoplastic film
(4) support mould
(5) opening in the support surface of the support mould 4
(6) support pin of the support mould 4
A-A' section line
B-B' section line

The invention claimed is:

1. A method for producing a composite glass pane, comprising:
    placing a first glass pane having a thickness less than or equal to 1 mm on a support mould, wherein the first glass pane is curved into a shape determined by the support mould;
    placing at least one thermoplastic film on the first glass pane;
    placing a curved second glass pane having a thickness greater than or equal to 1.5 mm on the at least one thermoplastic film; and
    joining the first glass pane to the second glass pane via the at least one thermoplastic film to form a composite glass pane by lamination,
    wherein the support mould has a plurality of support pins, on which the first glass pane rests in a substantially point-wise manner.

2. The method according to claim 1, wherein the support mould is convex.

3. The method according to claim 1, wherein the support mould has at least five support pins.

4. The method according to claim 1, wherein at least two support pins are heatable.

5. The method according to claim 1, wherein the support pins are movable independently of one another.

6. The method according to claim 1, wherein the first glass pane is sucked against the support mould by application of a negative pressure and is thus curved.

7. The method according to claim 1, wherein the first glass pane is chemically tempered.

8. The method according to claim 1, wherein the first glass pane is made of aluminosilicate glass and the second glass pane of soda lime glass.

9. The method according to claim 1, wherein the at least one thermoplastic film contains polyvinyl butyral, ethylene vinyl acetate, or polyurethane.

10. The method according to claim 1, wherein the second glass pane has a thickness of 1.5 mm to 5 mm.

11. The method according to claim 1, wherein the first glass pane has a thickness of 0.2 mm to 1.0 mm.

* * * * *